United States Patent [19]
Vanderheyden et al.

[11] Patent Number: 6,069,777
[45] Date of Patent: May 30, 2000

[54] DATA STORAGE TAPE CARTRIDGE WITH EXPOSED BASE PLATE DATUM FOR TAPE REGISTRATION

[75] Inventors: William J. Vanderheyden, River Falls, Wis.; G. Phillip Rambosek, Schafer, Minn.; David T. Hoge, Westminster; Christian A. Todd, Thornton, both of Colo.

[73] Assignees: Imation Corp., Oakdale, Minn.; Storage Technology Corp., Louisville, Colo.

[21] Appl. No.: 09/096,295

[22] Filed: Jun. 11, 1998

[51] Int. Cl.[7] ............................. G11B 15/60; G11B 23/04
[52] U.S. Cl. ...................... 360/132; 360/96.5; 242/338.4
[58] Field of Search ................................. 360/96.5, 132; 242/338.4, 344

[56] References Cited

U.S. PATENT DOCUMENTS

| | | | |
|---|---|---|---|
| 4,104,686 | 8/1978 | Hashimoto | 360/132 |
| 4,267,986 | 5/1981 | Uemura et al. | 242/199 |
| 4,561,610 | 12/1985 | Gyi | 242/198 |
| 4,819,889 | 4/1989 | Satoh | 242/199 |
| 5,547,142 | 8/1996 | Cheatham et al. | 242/338.1 |
| 5,558,291 | 9/1996 | Anderson et al. | 242/336 |
| 5,657,937 | 8/1997 | Todd et al. | 242/345.1 |
| 5,870,246 | 2/1999 | Hoelsaeter | 360/96.5 |

FOREIGN PATENT DOCUMENTS

| | | |
|---|---|---|
| 772 197 | 10/1996 | European Pat. Off. . |
| 2 126 561 | 8/1983 | United Kingdom . |
| 87/07424 | 12/1987 | WIPO . |

*Primary Examiner*—Jefferson Evans
*Attorney, Agent, or Firm*—Dicke, Billig & Czaja, P.A.

[57] ABSTRACT

A data storage tape cartridge having an exposed base plate datum for improved tape registration. The data storage tape cartridge includes a housing defined by a first housing section and a second housing section, a base plate, at least one tape reel and a storage tape. The base plate is disposed within the housing and includes a reference portion that is exposed through a protected opening in the first housing section. In one preferred embodiment, the first housing section protects the base plate, including the reference portion. The at least one tape reel is rotatably associated with the base plate. Finally, the storage tape is maintained by the at least one tape reel within the housing. Upon insertion of the data storage tape cartridge into a tape drive, a registration device engages the reference portion of the base plate to determine and precisely control location of the storage tape relative to a read/write head.

39 Claims, 6 Drawing Sheets

6,069,777

DATA STORAGE TAPE CARTRIDGE WITH EXPOSED BASE PLATE DATUM FOR TAPE REGISTRATION

BACKGROUND OF THE INVENTION

The present invention relates to a data storage tape cartridge. More particularly, it relates to a data storage tape cartridge having an exposed datum for improved tape registration.

Data storage tape cartridges have been used for decades in the computer, audio and video fields. While other forms of media storage, such as disk cartridges, are also available, the data storage tape cartridge continues to be an extremely popular form of recording large volumes of information for subsequent retrieval and use.

The data storage tape cartridge generally consists of an outer shell or housing maintaining at least one tape reel and a length of magnetic storage tape. The storage tape is wrapped about a hub portion of the tape reel and is driven through a defined tape path by a driving system. The housing normally includes a separate cover and base, the combination of which creates an opening (or window) of some type for allowing access to the storage tape by a read/write head upon insertion of the data storage tape cartridge into a tape drive. This interaction between storage tape and head may take place within the housing (e.g., a mid tape load design), or the storage tape may be directed away from the housing to an adjacent area at which the read/write head is located (e.g., a helical drive or a leader block design). Location of the storage tape within the housing is of minimal concern where the data storage tape cartridge is configured to have the storage tape directed from the housing to a separate head location. Conversely, where the tape cartridge/drive system is designed to provide head-storage tape interface within or very near the housing, precise positioning of the storage tape adjacent the window is extremely important. In this regard, positioning of the storage tape is dictated exclusively by the tape path defined within the tape cartridge housing.

In particular, with the internalized head-storage tape interface approach, the data storage tape cartridge normally includes two tape reels. The tape path is defined by the location of the tape reels maintaining the storage tape, as well as by various tape guides positioned within the housing. The tape reels are normally rotatably associated with either the cover or the base, and each includes a hub and opposing radial flanges. The storage tape is wrapped around the hub, between the opposing radial flanges. Generally speaking, then, with a two-tape reel design, the storage tape extends between the two hubs, along the tape guides. The tape guides are strategically positioned within the housing such that at the cartridge window, the storage tape is approximately parallel to a plane of the window.

Recent advancements in tape drives, read/write heads and magnetic tape media have greatly enhanced performance capabilities of the data storage tape cartridge. For example, evolution of magnetic tape media has resulted in storage tapes with increased storage capacity and product longevity. In the same regard, present day read/write heads are able to read and record information on increasingly smaller data tracks defined across a height of the storage tape. By employing reduced-size data tracks, the volume of information stored on the storage tape increases dramatically.

The improvements in read/write heads and magnetic tape media have placed greater demands on the data storage tape cartridge design. For example, in order for the read/write head to consistently interact with the storage tape at each of the tracks, the storage tape must be precisely positioned at the cartridge window. Any slight deviation from the desired planar positioning of the storage tape at the cartridge window may result in errors. If the storage tape is slightly above or below an expected location, upon insertion into the tape drive the read/write head will experience difficulties in finding a desired track. Similar problems occur if the tape path generates an angular orientation of the storage tape across the cartridge window. Obviously, the potential for read/write errors becomes more prevalent where reduced-size tracks are utilized.

Data storage tape cartridge designers have sought to address the above-described tape path positioning concern by, for example, positioning tape guides at opposite sides of the cartridge window. The tape guides serve to guide or position the storage tape across the cartridge window at a desired level and in a desired plane. In theory, then, when the data storage tape cartridge is inserted into the tape drive, the read/write head will engage the storage tape at this controlled position. Unfortunately, however, tape guides alone may be insufficient for locating the storage tape within the tight tolerances required by use of reduced-size data tracks.

For example, the tape guides and tape reels are commonly secured to an interior surface of either the base or the cover, both of which are normally molded plastic. While every effort is made to manufacture the base and/or cover as flat as possible, deformities are likely to occur. Similarly, over time, the plastic material may warp or otherwise bend. In either instance, the level (or height) of the various components maintained within the housing will change, either individually or as a whole. Even a minor change in the height of a single tape guide can alter the tape path to a point where reading/writing errors occur. More recently, the plastic cover has been replaced with a metal plate to which the tape reels and tape guides are attached. While use of a metal plate, at least initially, eliminates the inherent deformities associated with plastic molding, over time the metal plate can become damaged. Because an entire face of the metal plate is completely exposed, with repeated use, the metal plate will bend, dent, etc., again resulting in potentially catastrophic tape path deviation.

Even if the various components are attached to the cover (plastic or metal) or base at a precise height, registration problems within the tape drive may still occur. The tape drive normally includes a loader having a registration device. The loader initially receives and directs the data storage tape cartridge within the tape drive. The registration device then aligns the data storage tape cartridge adjacent the read/write head. Even a slight error in locating the data storage tape cartridge within the tape drive may result in the same read/write errors described above. Simply stated, proper registration of the data storage tape cartridge within the tape drive is equally as important as defining a consistent tape path within the cartridge housing itself.

One typical loader/registration device includes a slot in a frame of the tape drive sized to receive the cartridge housing. The data storage tape cartridge is thus inserted along the slot into the tape drive, with the slot having a known position and relationship with respect to the read/write head. Additionally, a suspension system of some type may be provided for supporting the cartridge housing at a certain location. Unfortunately, this generally accepted approach of locating the data storage tape cartridge within the tape drive may not provide consistent registration of the storage tape with the head. The above-described registration device relies solely upon the cartridge housing for alignment within the tape drive. Once again, the cartridge housing is normally made of a molded plastic material. Surface irregularities inherently resulting from plastic molding processing create unavoidable deviations in the flatness of the housing. In other words, even when the various internal components are properly secured to an interior surface of the housing, incorrect registration may occur where the exterior surface fluctuates even slightly. Further, where the internal components are secured to the cover, for example, and registration within the tape drive is made with reference to the base, inaccurate registration may occur. Additionally, because the cartridge housing may warp or bend over time, registration within the tape drive may change from use to use. Under these circumstances, it is quite possible that the read/write head will be unable to locate a track onto which information was previously recorded. In short, use of the plastic cartridge housing as a point of reference for registering the storage tape relative to the read/write head may lead to errors due to material irregularities, tolerance build-ups, positioning of the storage tape within the housing, etc.

Data storage tape cartridges are important tools used to maintain vast amounts of information. However, with increasingly complex reading/writing and magnetic tape technology, design of the data storage tape cartridge must evolve to provide accurate storage tape positioning and registration within tight tolerances. Therefore, a need exists for a data storage tape cartridge providing improved registration within a tape drive.

SUMMARY OF THE INVENTION

One preferred embodiment of the present invention provides a data storage tape cartridge that includes a housing, a base plate, at least one tape reel and a storage tape. The housing is defmed by a first housing section and a second housing section. The first and second housing sections mate with one another, forming an enclosure within which various other components of the data storage tape cartridge are maintained. The base plate is disposed within the housing and includes a reference portion. The reference portion of the base plate is exposed through an opening or notch in the first housing section. The at least one tape reel is rotatably associated with the base plate. Finally, the storage tape is maintained by the at least one tape reel.

During use, the data storage tape cartridge of the present invention provides consistent alignment of the tape reel and the storage tape relative to the base plate. In this regard, in one preferred embodiment, the base plate is made of a rigid, relatively flat material such that the tape reel and the storage tape can be positioned at a known height relative to the reference portion of the base plate. Further, upon insertion of the data storage tape cartridge into a tape drive, the reference portion of the base plate affords consistent registration of the storage tape relative to a read/write head.

Another preferred embodiment of the present invention relates to a data storage tape cartridge that includes a housing, at least one tape reel, a storage tape and a base plate. The housing defines an enclosure within which the tape reel, storage tape and base plate are disposed. In this regard, the storage tape is secured to the tape reel. Further, the tape reel is rotatably secured to the base plate such that the base plate maintains the tape reel and the storage tape at a known position. The base plate further includes a reference portion having a contact surface accessible from an exterior of the housing for identifying a location of the storage tape.

Upon final assembly, the base plate positions the tape reel, and thus the storage tape, at a known level within the housing. In a preferred embodiment, the base plate is substantially flat such that the reference portion of the base plate, and in particular the contact surface, has a known position relative to the storage tape. During use, the data storage tape cartridge is inserted into a tape drive. The data storage tape cartridge, and in particular the storage tape, is registered relative to the tape drive via engagement with the contact surface of the base plate.

A third embodiment of the present invention relates to a data storage tape cartridge for use with a tape drive including a registration device defining a vertical plane and a horizontal plane. The data storage tape cartridge includes a housing, a base plate, at least one tape reel and a storage tape. The housing defines an enclosure and includes a window for providing access to the enclosure. The base plate is disposed within the housing and includes a reference portion. The reference portion is accessible by the registration device of the tape drive for determining a location of the base plate. The tape reel is rotatably associated with the base plate. Finally, the storage tape is maintained by the tape reel and is accessible by the tape drive through the window of the housing.

During use, the registration device of the tape drive engages the reference portion of the base plate to register the data storage tape cartridge within the tape drive. For example, in one preferred embodiment, interaction between the registration device and the reference portion of the base plate defines a vertical location of the storage tape relative to the vertical plane of the registration device. As a result, accurate registration of the storage tape relative to the tape drive is achieved.

DETAILED DESCRIPTION OF THE PREFERRED EMBODIMENTS

Figure 1:
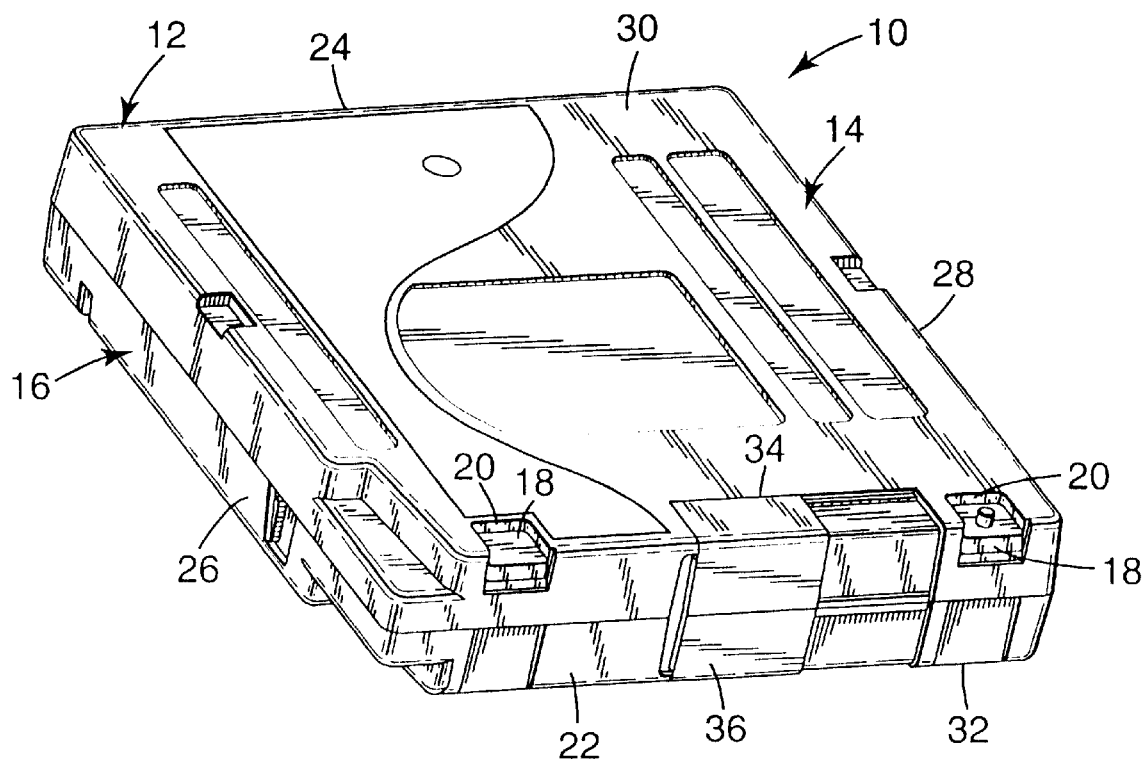
FIG. 1 is a perspective view of a data storage tape cartridge in accordance with the present invention.

One preferred embodiment of a data storage tape cartridge 10 is shown in FIG. 1. Generally speaking, the data storage tape cartridge 10 includes a housing 12 defined by a first housing section 14 and a second housing section 16. The data storage tape cartridge 10 further includes a base plate 18, a portion of which is exposed through notches 20 in the first housing section 14. Remaining components of the data storage tape cartridge 10 are described in greater detail below. However, with reference to FIG. 1, it should be understood that the first housing section 14 and the second housing section 16 are reciprocally mated to one another and form an enclosure within which the various other components, including the base plate 18, are maintained.

The housing 12 is preferably sized to be received by a typical tape drive (not shown). Thus, the housing 12 may be sized for use within a 5.25 inch (130 mm) form factor drive, a 3.5 inch (90 mm) form factor drive, or other useful sizes. The housing 12, and thus the first housing section 14 and the second housing section 16, defines a front 22, a back 24, a first side 26 and a second side 28. The first housing section 14 forms a top planar surface 30, whereas the second housing section 16 forms a bottom planar surface 32.

The first housing section 14 and the second housing section 16 combine to form a window 34 at the front 22 through which storage tape (not shown) otherwise maintained within the housing 12 can be accessed by a read/write head (not shown). To this end, the data storage tape cartridge 10 includes a door 36. The door 36 is slidably secured to the housing 12 such that the door 36 can be selectively moved to provide access to the window 34. As shown in FIG. 1, the door 36 is normally spring loaded or biased to a closed position for protecting the storage tape from contamination when not in use.

In a preferred embodiment, the first housing section 14 is a cover, whereas the second housing section 16 is a base. Alternatively, the design of the data storage tape cartridge 10 can be such that the first housing section 14 forms a base, whereas the second housing section 16 is a cover. With reference to the orientation shown in FIG. 1, the data storage tape cartridge 10 is normally inserted into a tape drive (not shown) with the cover 14 facing upward. As used throughout this specification, directional terminology such as "upward", "downward", "vertical", "horizontal", "top", "bottom", etc. are used with reference to the orientation of the particular figure being described. It should be understood that use of the terms is for clarity only, and that the data storage tape cartridge 10, and thus any of its components, may actually be orientated in any direction relative to the world in general. As such, these terms are not meant to serve as limitations.

The first housing section 14 and the section housing section 16 are preferably made of a molded plastic. In this regard, the notches 20 in the first housing section 14 are formed during the molding process. The notches 20 are preferably formed at the front 22 of the first housing section 14, extending along the top planar surface 30. The notches 20 have a preferred length of about 0.35 inch (8.9 mm), although other dimensions are acceptable. Even further, the notches 20 can be an opening or openings positioned anywhere in the housing 12, so long as access to the base plate 18 is afforded.

Figure 2:
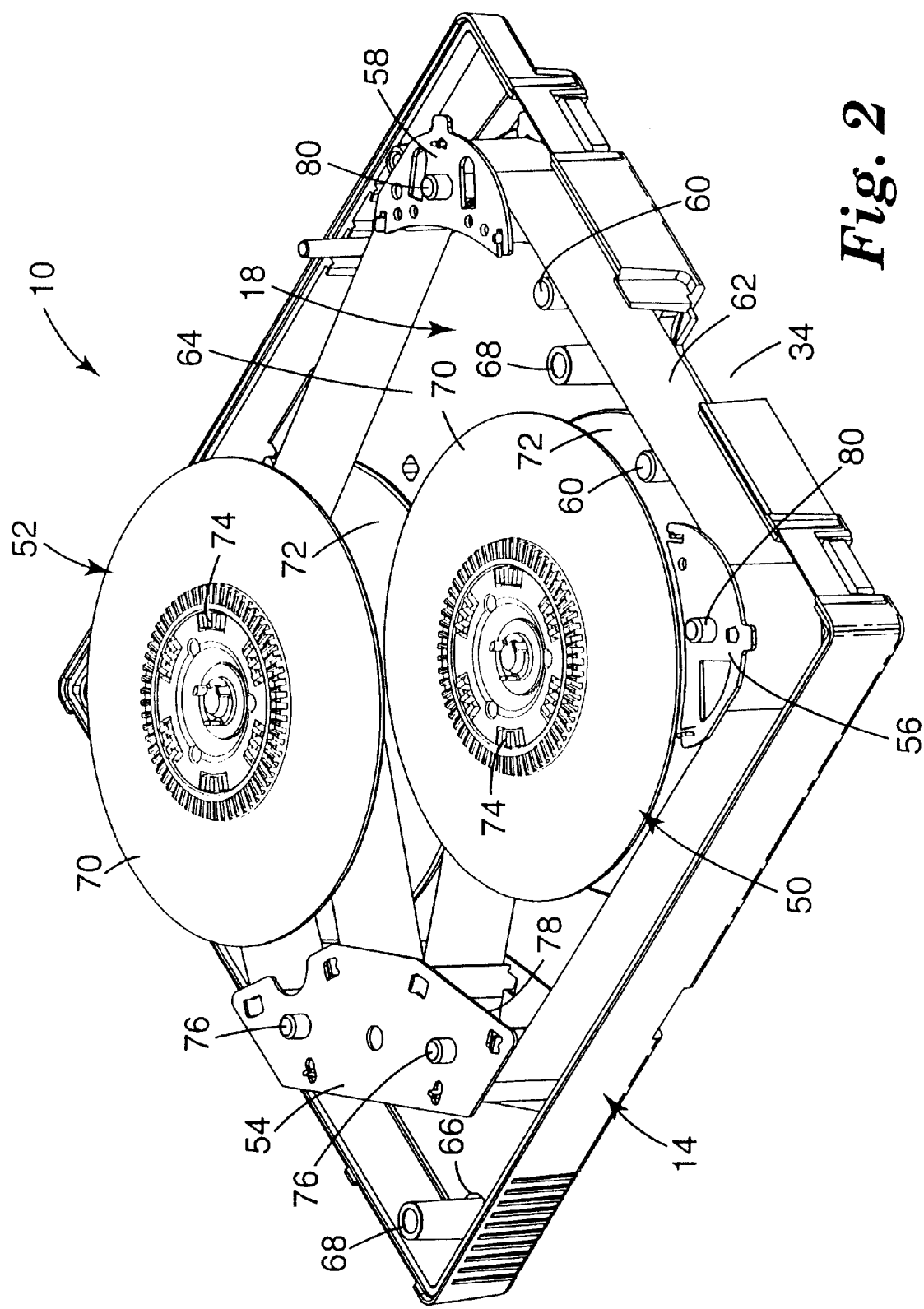
FIG. 2 is a perspective view of the data storage tape cartridge of the present invention with a portion of a housing removed.

Remaining components of the data storage tape cartridge 10 are shown in FIG. 2. Notably, for ease of illustration, FIG. 2 depicts the first housing section 14 in an inverted position, and the second housing section 16 (FIG. 1) removed. With this orientation in mind, the data storage tape cartridge 10 includes the base plate 18, a first tape reel 50, a second tape reel 52, a first corner guide (or idler bearing) 54, a second corner guide 56, a third corner guide 58, pin guides (or head wrap pins) 60 and a storage tape 62. The first tape reel 50 and the second tape reel 52 are rotatably secured about respective hub pins (not shown) extending from an interior surface 64 of the base plate 18. The remaining guides 54–60 are secured to the interior surface 64 of the base plate 18.

The base plate 18 is described in greater detail below. Generally speaking, the base plate 18 is sized to nest within the first housing section 14 and includes recesses 66 positioned to allow passage of various protrusions 68 in the first housing section 14. The protrusions 68 are configured to frictionally receive extensions (not shown) of the second housing section 16 (FIG. 1).

The first and second tape reels 50, 52 are virtually identical and are positioned to rotate relative to the base plate 18 about the respective hub pins (not shown). Each of the first and second tape reels 50, 52 includes a central hub (not shown), an upper flange 70, a lower flange 72 and a toothed exterior surface 74. The upper flange 70 and the lower flange 72 are secured to opposite ends of the central hub and are spaced in accordance with a height of the storage tape 62. The toothed exterior surface 74 is formed as an axial extension of the hub above the upper flange 70. During use, a portion of the tape drive (not shown) engages the toothed exterior surfaces 74 for controlled rotation of the first and second tape reels 50, 52. In a preferred embodiment, the tape reels 50, 52 are made of plastic.

The first corner guide 54 is secured to the interior surface 64 of the base plate 18 by pins 76 and includes a first arcuate surface 78 (shown partially in FIG. 2) and a second arcuate surface (not shown). The second corner guide 56 and the third corner guide 58 are similarly secured to the interior surface 64 of the base plate 18 by pins 80 and likewise each provide an arcuate surface. Finally, the pin guides 60 are secured to the interior surface 64 of the base plate 18 adjacent the window 34 in the first housing section 14. The various guides 54–60 are preferably made of a rigid material such as stainless steel. Alternatively, other materials such as aluminum, hardened plastic, etc. are also available.

Finally, the storage tape 62 is preferably a magnetic tape of a type commonly known in the art. For example, the storage tape 62 may consist of a balanced polyethylene naphthalate (PEN) based material coated on one side with a layer of magnetic material dispersed within a suitable binder system, and on the other side with a conductive material dispersed in a suitable binder system. Acceptable magnetic tape is available, for example, from Imation Corp. of St. Paul, Minn.

As shown in FIG. 2, the above components combine to define a tape path for the storage tape 62. In particular, the storage tape 62 extends from the first tape reel 50 and articulates around the first arcuate surface 78 of the first corner guide 54, then extending to the second corner guide 56 and the third corner guide 58. Notably, the pin guides 60 maintain a planar positioning of the storage tape 62 adjacent the window 34 of the first housing section 14. From the third corner guide 58, the storage tape 62 articulates about an exterior portion of the second tape reel 52, extends to the second arcuate surface (not shown) of the first corner guide 54 and is finally wrapped around the second tape reel 52. It will be recognized by one skilled in the art that the tape path depicted in FIG. 2 is but one of many available designs. By incorporating different guides at varying locations, the resulting tape path may be substantially different from that shown in FIG. 2. So long as the storage tape articulates in a planar fashion at the window 34, the benefits of the present invention will be realized.

As should be evident from the above description, regardless of the exact tape path, the storage tape 62 is required to articulate through several radial turns when passing from the first tape reel 50 to the second tape reel 52. The various guides 54–60 are preferably configured to maintain the storage tape 62 at a predetermined level, especially in the region of the window 34. In this regard, location and extension of the various guides 54–60, as well as the hub pins (not shown) upon which the first tape reel 50 and the second tape reel 52 are rotatably disposed, is ensured by use of the base plate 18, which is shown in greater detail in FIG. 3.

Figure 3:
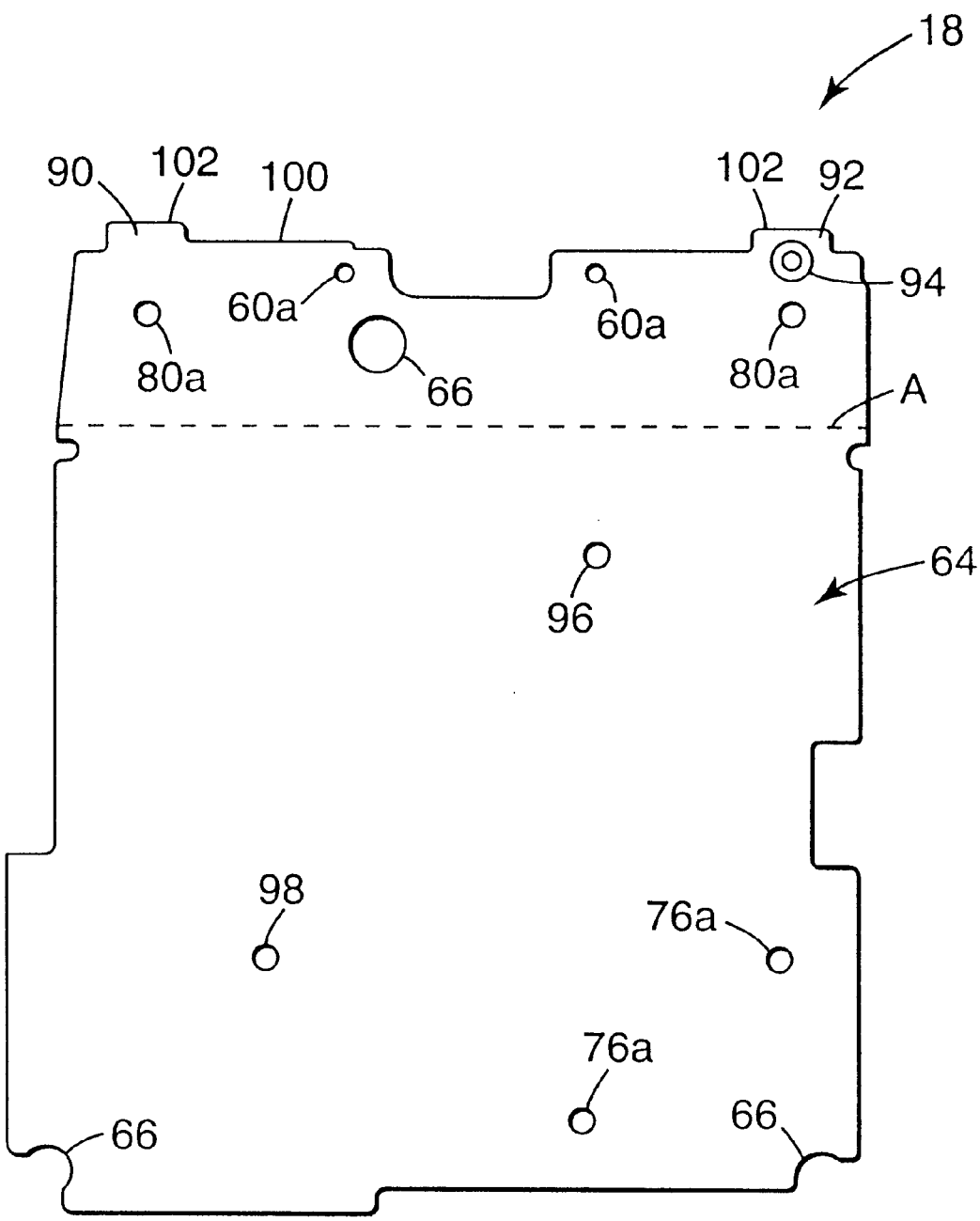
FIG. 3 is an enlarged top view of a base plate portion of the data storage tape cartridge in accordance with the present invention.

FIG. 3 is enlarged, top view of the base plate 18, depicting the interior surface 64. The base plate 18 is preferably a singular body and defines a first reference portion 90 and a second reference portion 92. A datum pin 94 is positioned adjacent the second reference portion 92. Notably, only a location of the datum pin 94 is shown in FIG. 3 because, as described below, the datum pin 94 extends from an exterior surface (not shown) of the base plate, or into the page of FIG. 3.

As previously described, the base plate 18 is preferably sized to nest within the first housing section 14 (FIG. 2). In this regard, FIG. 3 depicts the recesses 66 formed in the base plate 18 for allowing passage of the protrusions 68 (FIG. 2) of the first housing section 14. Additionally, FIG. 3 depicts pin guide bores 60a for receiving the pin guides 60 (FIG. 2). Likewise, the base plate 18 forms pin bores 76a and 80a in the interior surface 64 sized to receive the respective pins 76, 80 (FIG. 2) used to maintain the first, second and third corner guides 54, 56 and 58 (FIG. 2). Additionally, a first hub pin bore 96 and a second hub pin bore 98 are shown in FIG. 3. The first hub pin bore 96 is sized to maintain a hub pin for rotatably receiving the first tape reel 50 (FIG. 2). The second hub pin bore 98 is sized to maintain a hub pin for rotatably receiving the second tape reel 52 (FIG. 2).

The base plate 18 is made of a relatively rigid material, preferably aluminum. Alternatively, other rigid metals, such as stainless steel, may also be used. Even further, a relatively rigid ceramic or plastic may also be useful. In the preferred embodiment, the base plate 18 is formed by a stamping process and has a thickness of about 0.100 inch (2.54 mm). Other manufacturing techniques and thickness are also available. By employing a rigid material, the flatness of the base plate 18 can be maintained within a tight tolerance range. In particular, the flatness of the base plate 18 is preferably in the range of 0.001–0.003 inch-inch (0.025–0.076 mm-mm). This tolerance requirement is of increased importance in a region of the base plate 18 near the first reference portion 90 and the second reference portion 92. For example, the flatness tolerance range is preferably maintained between the first and second reference portions 90, 92 and a demarcation line A shown in FIG. 3.

The first reference portion 90 and the second reference portion 92 are configured to provide a fundamental reference point for the various components maintained on the base plate 18. In a preferred embodiment, the first reference portion 90 and the second reference portion 92 are preferably identical in shape and size. In this regard, the first reference portion 90 and the second reference portion 92 preferably form tabs extending from a leading edge 100 of the base plate 18. With this preferred configuration, the first reference portion 90 and the second reference portion 92 have a preferred width in the range of 0.2–0.5 inch (5.1–12.7 mm), preferably 0.375 inch (9.525 mm). For reasons made more clear below, the first and second reference portions 90, 92 are preferably spaced as far apart as possible so as to maximize subsequent registration of the base plate 18. For example, the first and second reference portions 90, 92 are spaced by a distance of approximately 3 inches (76 mm). It should be understood, however, the other dimensions, shapes and locations are equally acceptable.

The first reference portion 90 and the second reference portion 92 form a forward edge 102 of the base plate 18. The various components otherwise attached to the base plate 18, such as the pin guides 60 (FIG. 2), the corner guides 54–58 (FIG. 2), and the hub pins, are all disposed along the interior surface 64 of the base plate 18 a predetermined distance from the forward edge 102. Additionally, the various components each extend from the interior surface 64 of the base plate 18 a known distance. The flatness of the base plate 18 dictates that this distance is identifiable by reference to the first and second reference portions 90, 92. Consequently, because the storage tape 62 (FIG. 2) is maintained by the various components, the location of the storage tape 62 relative to the first and second reference portions 90, 92 is known. For example, in a preferred embodiment, the storage tape 62 is positioned such that an upper edge of the storage tape is approximately 0.7 inch (17 mm) from a horizontal plane of the first and second reference portions 90, 92. Further, for example, the storage tape 62 is located approximately 0.16 inch (3.5 mm) from the forward edge 102 of the first and second reference portions 90, 92. Obviously, these preferred dimensions are but one example of storage tape location relative to the first and second reference portions 90, 92.

The datum pin 94 is positioned adjacent the second reference portion 92 at a known location. The datum pin 94 extends from an exterior surface (not shown, but should be understood as being opposite the interior surface 64 shown in FIG. 3) of the base plate 18 in a generally perpendicular fashion (into the paper of FIG. 3). The datum pin 94 is preferably made of a rigid metal, such as stainless steel. Alternatively, other metals, such as aluminum, are equally acceptable. In one preferred embodiment, the datum pin 94 is assembled to the base plate 18 via a press fitting operation. As shown in greater detail below, the datum pin 94 is preferably a cylinder, having a preferred diameter of approximately 0.1 inch (2.5 mm), and defines a side-to-side position of the base plate 18, and thus of the various components maintained by the base plate 18.

Figure 4:
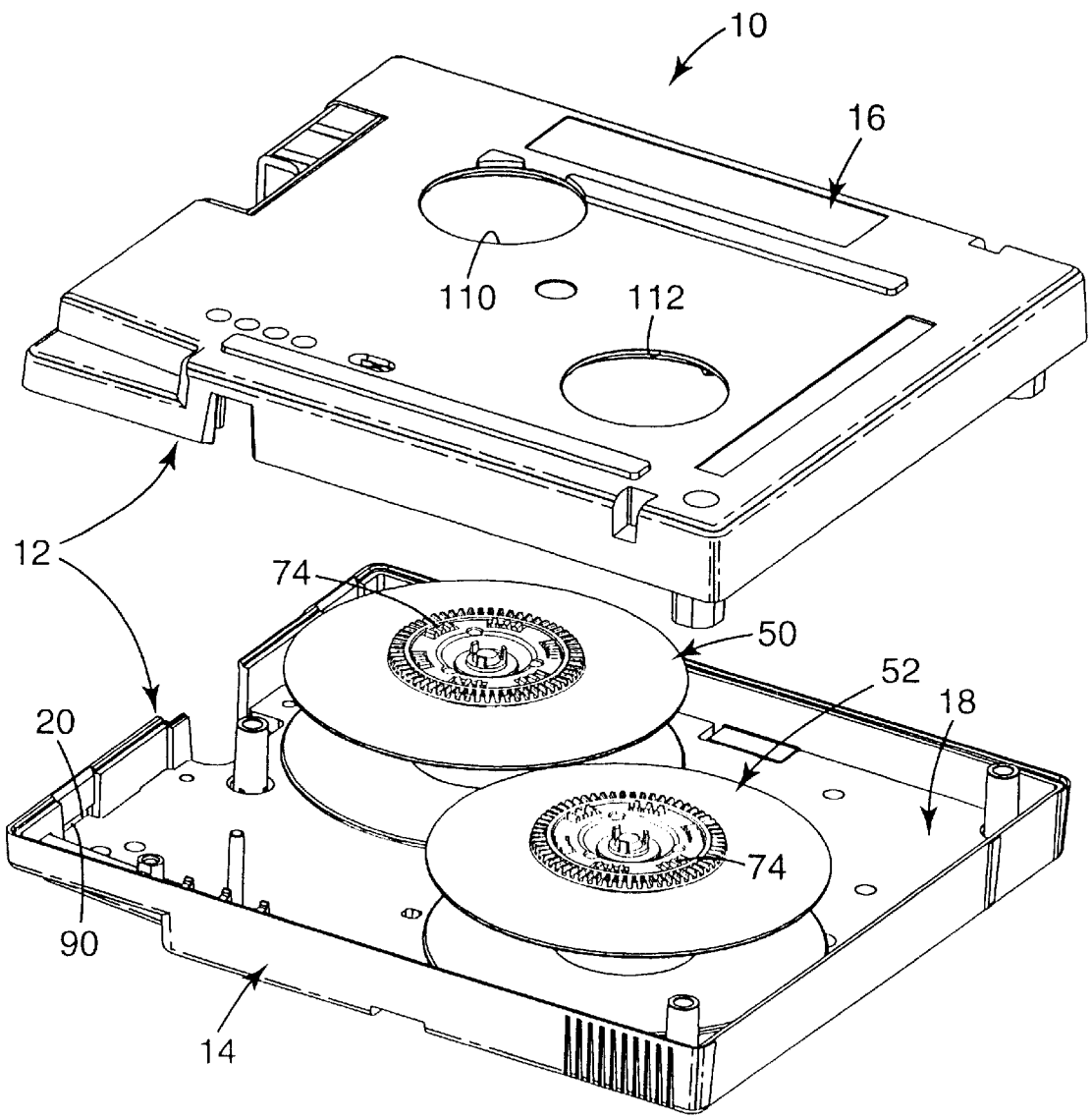
FIG. 4 is an exploded view of the data storage tape cartridge in accordance with the present invention.

The data storage tape cartridge 10 is assembled as shown in FIG. 4. Notably, for purposes of clarity, FIG. 4 does not depict the guides 54–60 (FIG. 2) or the storage tape 62 (FIG. 2). The base plate 18 is manufactured to nest within the first housing section 14. In particular, the base plate 18 is positioned such that the first reference portion 90 and the second reference portion 92 (FIG. 3) of the base plate 18 are positioned at the notches 20 of the first housing section 14. The first tape reel 50 and the second tape reel 52 are assembled to the base plate 18. In this regard, the first tape reel 50 is rotatably mounted to a hub pin extending from the first hub pin bore 96 (FIG. 3) in the base plate 18. Similarly, the second tape reel 52 is rotatably mounted to a hub pin extending from the second hub pin bore 98 (FIG. 3). The corner guides 54–58 (FIG. 2) and the pin guides 60 (FIG. 2) are likewise attached to the base plate 18. Finally, the storage tape 62 (FIG. 2) is guided through the previously defined tape path.

Once the various components have been assembled to the base plate 18, the second housing section 16 is frictionally secured to the first housing section 14. To this end, the second housing section 16 includes a first opening 110 and a second opening 112. The first opening 110 is sized to provide access to the toothed exterior surface 74 of the first tape reel 50. Similarly, the second opening 112 is sized to provide access to the toothed exterior surface 74 of the second tape reel 52.

Figure 5:
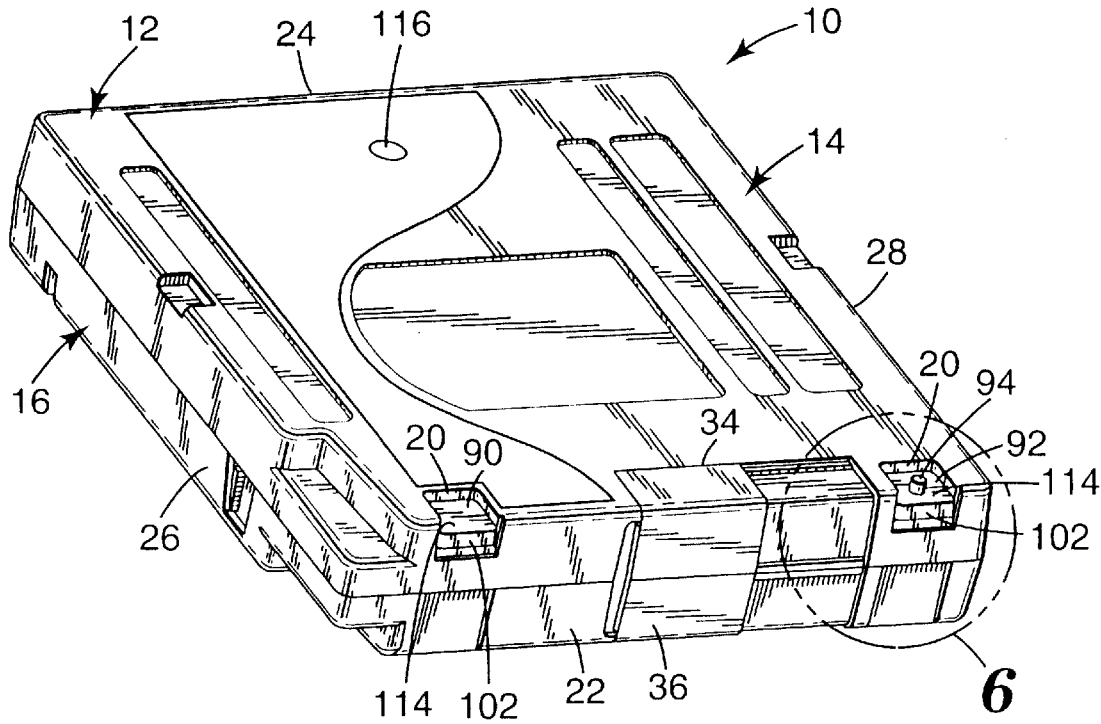
FIG. 5 is an elevational view of the data storage tape cartridge in accordance with the present invention.

During use, the data storage tape cartridge 10 of the present invention utilizes a plane of the internal base plate 18 as a fundamental reference point. This is best shown in FIG. 5 in which the first and second reference portions 90, 92 of the base plate 18 (FIG. 4) are exposed from the housing 12 via the notches 20 in the first housing section 14. Thus, the first housing section 14 is configured to provide access to the first and second reference portions 90, 92 from a point exterior the housing 12. Importantly, while the first and second reference portions 90, 92 are exposed, the first housing section 14 protects against possible damage to the first and second reference portions 90, 92. In the preferred embodiment, the first and second reference portions 90, 92 are effectively recessed within the housing 12. With this configuration, normal handling of the data storage tape cartridge 10 will not cause undesirable deviations in the first and second reference portions 90, 92 (or in the remainder of the base plate 18 (FIG. 4)). Thus, unlike previous designs in which an entire side of the base plate 18 is exposed, the first housing section 14 protects the base plate 18, including the first and second reference portions 90, 92, thereby extending the useful life of the data storage tape cartridge 10.

As shown in FIG. 5, the exposed portions of the first and second reference portions 90, 92 includes the forward edge 102, which defines a vertical contact surface, and a horizontal contact surface 114. The second reference portion 92 further includes the datum pin 94. These exposed components of the first and second reference portions 90, 92 accurately define location of the data storage tape cartridge 10, and more particularly the storage tape 62 (FIG. 2) disposed therein, in several areas, including skew, forward positioning, wrap angle and tilt.

With respect to tilt of the data storage tape cartridge 10, an additional planar reference point is provided along the first housing section 14. In particular, a datum point 116 is defined in an outer surface of the first housing section 14, preferably near the back 24 of the housing 12. The datum point 116 is included to give an indication of a tilt of the data storage tape cartridge 10 from the front 22 to the back 24. In other words, by locating the datum point 116 near the back 24, a tilt of the data storage tape cartridge 10 can be determined and controlled. Because, as described below, tilt of the data storage tape cartridge 10 is relatively easy to control, the datum point 116 need not be made with reference to the base plate 18 (FIG. 4), but instead with respect to the first housing section 14. It should be recognized that the datum point 116 could be on the base plate 18, in conjunction with a raised boss or hole in the first housing section 14. Alternatively, the datum point 116 can be located in the second housing section 16. Even further, with an appropriately designed tape drive, the datum point 116 can be eliminated entirely.

Figure 6:
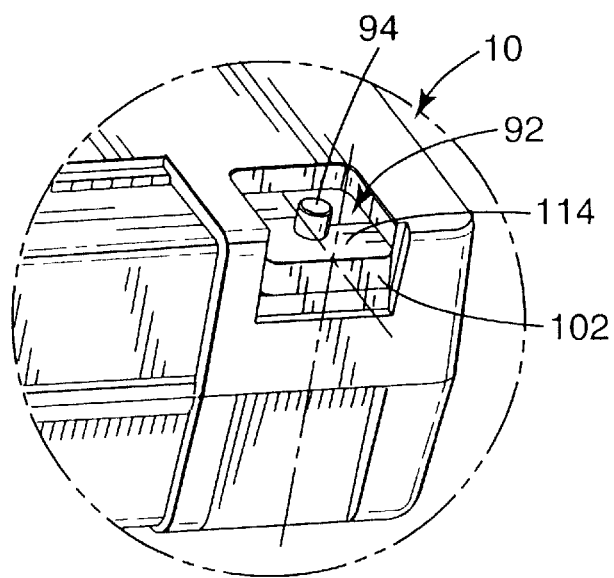
FIG. 6 is an enlarged view of a portion of the data storage tape cartridge of FIG. 5.

The skew, forward positioning and wrap angle designations are shown more clearly in FIG. 6 that presents an enlarged view of a portion of the data storage cartridge 10, including the second reference portion 92. While not shown, the first reference portion 90 is identical, except that the first reference portion 90 does not include the datum pin 94. First, the horizontal contact surface 114 of the second reference portion 92 defines a height (or skew) of the storage tape 62 (FIG. 2) in that the storage tape 62 extends in a plane perpendicular to the horizontal contact surface 114 to a known height. Second, the forward edge 102 of the second reference portion 92 defines a vertical contact surface. Once again, a plane of the vertical contact surface 102 is located at a predetermined distance from a plane of the storage tape 62. Thus, a forward position of the storage tape 62 is defined by the forward edge 102. Third, the datum pin 94 defines a side-to-side location or wrap angle of the storage tape 62. For example, the datum pin 94 is generally a predetermined distance from the window 34 (FIG. 5) through which the storage tape 62 is accessed. Thus, by controlling a position of the datum pin 94, the location of the storage tape 62 relative to a side of the data storage tape cartridge 10 is known.

Figure 7:
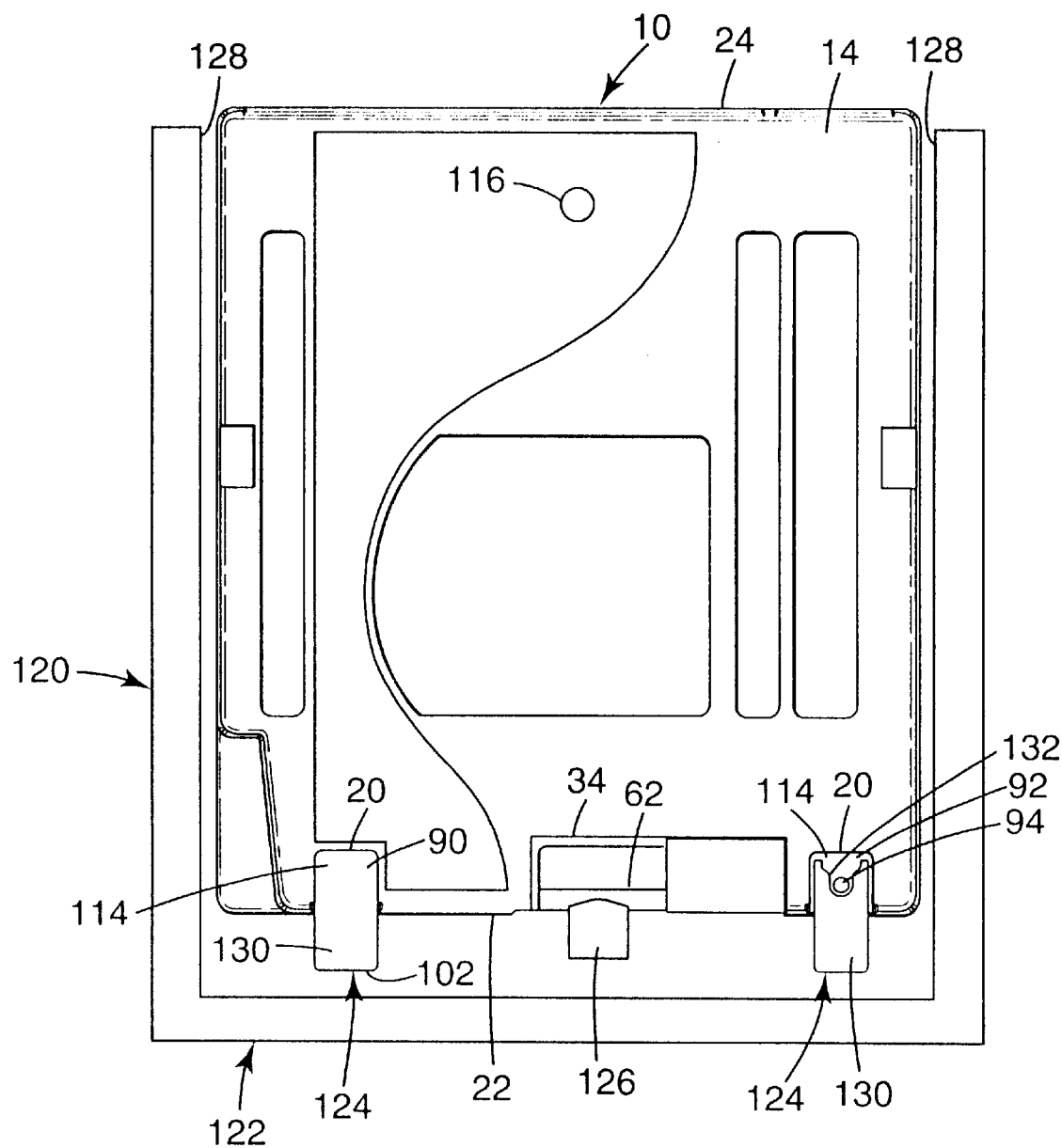
FIG. 7 is a top view of the data storage tape cartridge in accordance with the present invention inserted into a tape drive shown in block form.

FIG. 7 depicts insertion of the data storage tape cartridge 10 into a tape drive 120. The tape drive 120 includes a frame 122, a registration device 124 and a read/write head 126. For ease of illustration, the frame 122, the registration device 124 and the read/write head 126 are shown in block form. The frame 122 defines a cartridge insertion opening 128 into which the data storage tape cartridge 10 is inserted. As shown by the orientation of FIG. 7, the data storage tape cartridge 10 is positioned such that the front 22 is adjacent the read/write head 126. The registration device 124 includes datum arms 130 for engaging the first and second reference portions 90, 92 of the base plate 18 (FIG. 4). Once again, the first and second reference portions 90, 92 are accessible exteriorly of the housing 12 via the notches 20. Additionally, the datum arm 130 adjacent the second reference portion 92 includes a slot 132 sized to receive the datum pin 94.

In general terms, upon engaging the first and second reference portions 90, 92, the registration device 124 controls the vertical location (or skew) of the data storage tape cartridge 10, and thus of the storage tape 62, relative to the read/write head 126 via the first and second reference portions 90, 92. It should be understood that the "vertical" location of the data storage tape cartridge 10 is in reference to a plane perpendicular to the plane of FIG. 7. Similarly, the registration device 124 controls the forward location of the data storage tape cartridge 10, and thus of the storage tape 62, relative to the read/write head 126 via the first and second reference portions 90, 92. The forward location of the storage tape 62 defines a penetration of the read/write head 126 into the housing 12 at the window 34. It should be understood that the "forward" location of the data storage tape cartridge 10 is in reference to a distance between the read/write head 126 and the storage tape 62 in the plane of FIG. 7. The registration device 124 also controls the tilt of the data storage tape cartridge 10 by reference to the external datum point 116 of the first housing section 14 and the first and second reference portions 90, 92. It should be understood that "tilt" of the data storage tape cartridge 10 is in reference to an angular orientation from the front 22 to the back 24. Finally, the registration device 124 controls side-to-side positioning of the data storage tape cartridge 10, and thus a wrap angle the storage tape 62 relative to the read/write head 126, via the datum pin 94. It should be understood that "side-toside" location is in reference to centering of the data storage tape cartridge 10 within the frame 122. Each of these four features is described in greater detail below.

The vertical location (or skew) of the data storage tape cartridge 10 is controlled by the registration device 124 via the datum arms 130 engaging the horizontal contact surfaces 114 of the first and second reference portions 90, 92. As previously explained, the horizontal contact surfaces 114 are parallel to the edges of the storage tape 62. Thus, by controlling the vertical location of the horizontal contact surfaces 114, the vertical location of the storage tape 62 is likewise controlled. Further, by utilizing the two, spaced reference portions 90, 92, the registration device 124 is also able to control skew of the storage tape 62. More particularly, the registration device 124 maintains the vertical position of the data storage tape cartridge 10 at opposite sides of the window 34. Thus, because the storage tape 62 is maintained at the same vertical height at both sides of the window 34, the storage tape 62 will not be skewed at a point of contact with the read/write head 126. In a preferred embodiment, skew is maintained within a tolerance range of approximately 1–2 arc-minute.

The forward location of the data storage tape cartridge 10 is controlled by the registration device 124 via the datum arms 130 engaging the vertical contact surface (or forward edge) 102 (shown best in FIG. 6) of the first and second reference portions 90, 92. As previously described, the distance between the vertical contact surfaces 102 of the first and second reference portions 90, 92 and the storage tape 62 is known. By controlling the forward location of the base plate 18 at the first and second reference portions 90, 92, the registration device 124 can precisely control a distance between the read/write head 126 and the storage tape 62. Further, penetration of the read/write head 126 into the window 34 during a reading or writing operation is likewise accurately controlled.

The tilt of the data storage tape cartridge 10 is controlled by the registration device 124 via engaging the datum point 116 of the first housing section 14 and controlling the height (or vertical location) of the datum point 116 relative to the vertical location of the first and second reference portions 90, 92, as defined by the horizontal contact surfaces 114. Because the datum point 116 is formed in the first housing section 14, as opposed to the base plate 18, the registration device 124 preferably includes an offset to account for a thickness of the first housing section 14. In one preferred embodiment, the offset is approximately 0.1 inch (2.54 mm), although any other offset value, approximately equivalent to a thickness of the first housing section 14, is equally acceptable. Notably, because the read/write head 126 can account for slight variations in front-to-back tilt of the storage tape 62, the tilt of the data storage tape cartridge 10 is not as critical a parameter, so that use of the first housing section 14 (which is preferably plastic) as a reference is acceptable. For example, in one preferred embodiment, tilt is maintained within a tolerance range of 10–20 arc-minute.

Finally, the side-to-side location of the data storage tape cartridge 10 is controlled by the registration device 124 via the slot 132 engaging the datum pin 94. Through this engagement, the registration device 124 can precisely position the data storage tape cartridge 10, and thus the storage tape 62, at a known side-to-side position relative to the read/write head 126. As a result, the wrap angle (or amount the storage tape 62 wraps around the read/write head 126) is controlled.

The data storage tape cartridge with exposed datum for tape registration of the present invention provides a marked improvement over previously used designs. First, by incorporating a relatively rigid base plate to maintain various components within the housing, the storage tape is precisely positioned in a desired tape path adjacent a window in the housing. Because the base plate is preferably made of metal, this positioning will not change over time as the base plate will not warp or otherwise bend. In conjunction with this controlled tape path, the data storage tape cartridge of the present invention utilizes the plane of the internal base plate as a fundamental reference point for subsequent registration in a tape drive. More particularly, by exposing portions of the base plate for engagement with a registration device, location of the storage tape can be accurately controlled. Importantly, the controlled registration is made independent of the plastic cartridge housing. Thus, any variations in the plastic cartridge housing material, or other tolerance problems, will not affect registration within the tape drive. For purposes of registration, the cartridge housing is simply disregarded. Finally, by enclosing the base plate within the housing and exposing the reference portions through recesses, the base plate, including the reference portions, are protected from damage.

Although the present invention has been described with reference to preferred embodiments, workers skilled in the art will recognize that changes may be made in form and detail with departing from the spirit and scope of the invention. For example, while the data storage tape cartridge has been shown as preferably incorporating a dual tape reel design, the base plate and exposed datum of the present invention applies equally as well to a single tape reel design. Further, while the data storage tape cartridge has been described as preferably providing two reference portions in the base plate, any number, either greater or smaller may be used. Similarly, while the reference portions have been described as preferably including a horizontal contact surface and a vertical contact surface, acceptable registration may still occur where only one of the contact surfaces is made available. Finally, the reference portions have been shown as terminating at a point approximately parallel the front of the cartridge housing. Instead, however, the reference portions may extend from the cartridge housing and may be located at points other than at the front of the cartridge housing.

What is claimed:

1. A data storage tape cartridge comprising:

a housing defining a first housing section and a second housing section;

a base plate disposed within the housing such that the base plate nests within the first housing section, wherein a first reference portion of the base plate is exposed through an opening in the first housing section;

at least one tape reel rotatably associated with the base plate; and a storage tape maintained by the at least one tape reel.

2. The data storage tape cartridge of claim 1, wherein the first reference portion of the base plate forms a datum reference point for the storage tape.

3. The data storage tape cartridge of claim 1, wherein the data storage tape cartridge is configured for insertion into a tape drive including a registration device, and further wherein the first reference portion of the base plate is configured to be engaged by the registration device.

4. The data storage tape cartridge of claim 1, wherein the storage tape extends within the housing along a tape path, the housing including a window for accessing the tape path, and further wherein the first reference portion of the base plate includes a contact surface in a plane substantially parallel to a plane of the tape path adjacent the window.

5. The data storage tape cartridge of claim 1, wherein the storage tape extends within the housing along a tape path, the housing including a window for accessing the tape path, and further wherein the first reference portion of the base plate includes a contact surface in a plane substantially perpendicular to a plane of the tape path adjacent the window.

6. The data storage tape cartridge of claim 5, wherein the window is formed at a front of the housing, the front of the housing being a leading end of the data storage tape cartridge upon insertion into a tape drive.

7. The data storage tape cartridge of claim 6, wherein the first reference portion of the base plate is adjacent the front.

8. The data storage tape cartridge of claim 1, wherein the first reference portion of the base plate includes a datum pin.

9. The data storage tape cartridge of claim 1, wherein the data storage tape cartridge further includes a hub pin extending in a generally perpendicular fashion from the base plate, the hub pin configured to receive the at least one tape reel.

10. The data storage tape cartridge of claim 1, wherein the data storage tape cartridge further includes a tape guide attached to the base plate, the tape guide configured to receive the storage tape.

11. The data storage tape cartridge of claim 1, wherein the base plate further includes a second reference portion exposed through a second opening in the first housing section, the first reference portion being spaced from the second reference portion.

12. The data storage tape cartridge of claim 11, wherein the housing forms a window for providing access to the storage tape, and further wherein the first and second openings in the first housing section are located at opposite sides of the window.

13. The data storage tape cartridge of claim 1, wherein the first reference portion is recessed within the opening of the first housing section for protecting the first reference portion.

14. The data storage tape cartridge of claim 1, wherein the first housing section includes a datum point spaced from the opening, the datum point formed on an exterior surface of the first housing section and configured to indicate a tilt of the data storage tape cartridge.

15. The data storage tape cartridge of claim 1, wherein the first reference portion is relatively flat.

16. The data storage tape cartridge of claim 1, wherein the base plate is relatively rigid.

17. The data storage tape cartridge of claim 1, wherein the first housing section defines a front and a back, and further wherein the opening in the first housing section is a notch extending from the front.

18. A data storage tape cartridge comprising:
    a housing defining an enclosure and including a first housing section and a second housing section;
    at least one tape reel disposed within the enclosure of the housing;
    a storage tape secured to the at least one tape reel; and
    a base plate nested within the first housing section, the base plate maintaining the at least one tape reel and the storage tape at a known position, the base plate including a first reference portion having a contact surface accessible from an exterior of the housing for identifying a location of the storage tape.

19. The data storage tape cartridge of claim 18, wherein the housing forms an opening for providing access to the first reference portion of the base plate.

20. The data storage tape cartridge of claim 19, wherein the first reference portion is recessed within the opening for protecting the first reference portion.

21. The data storage tape cartridge of claim 18, wherein the housing includes a window for providing access to the storage tape, the storage tape extending within the housing along a known tape plane adjacent the window, and further wherein the contact surface extends in a plane substantially parallel to the tape plane.

22. The data storage tape cartridge of claim 18, wherein the housing includes a window for providing access to the storage tape, the storage tape extending within the housing along a known tape plane adjacent the window, and further wherein the contact surface extends in a plane substantially perpendicular to the tape plane.

23. The data storage tape cartridge of claim 18, wherein the housing includes a window for providing access to the storage tape, the storage tape extending within the housing along a known tape plane adjacent the window, and further wherein the contact surface includes a first side and a second side, the first side being substantially parallel to the tape plane and the second side being substantially perpendicular to the tape plane.

24. The data storage tape cartridge of claim 18, wherein the first reference portion further includes a pin extending in a generally perpendicular fashion from the contact surface.

25. The data storage tape cartridge of claim 18, wherein the base plate further includes a second reference portion having a contact surface accessible from an exterior of the housing, the second reference portion being spaced from the first reference portion.

26. The data storage tape cartridge of claim 18, wherein the first reference portion is relatively flat.

27. A data storage tape cartridge for use with a tape drive including a registration device defining a vertical plane and a horizontal plane, the data storage tape cartridge comprising:
    a housing forming a window and including a first housing section and a second housing section;
    a base plate nested within the first housing section, the base plate including a reference portion, the reference portion being accessible by a registration device for determining a location of the base plate;
    at least one tape reel rotatably associated with the base plate; and
    a storage tape maintained by the at least one tape reel, the storage tape being accessible through the window of the housing.

28. The data storage tape cartridge of claim 27, wherein the reference portion is configured to be contacted by the registration device in a plane substantially parallel to the horizontal plane of the registration device.

29. The data storage tape cartridge of claim 28, wherein the reference portion defines a location of the storage tape at the window in a vertical plane of the registration device.

30. The data storage tape cartridge of claim 27, wherein the reference portion is configured to be contacted by the registration device in a plane substantially parallel to the vertical plane of the registration device.

31. The data storage tape cartridge of claim 30, wherein the tape drive further includes a frame, defining a cartridge insertion opening, and a head located opposite the cartridge insertion opening, the data storage tape cartridge being inserted into the frame such that a front of the data storage tape cartridge is adjacent the head, and further wherein the reference portion of the base plate defines a forward location of the storage tape at the window relative to the head.

32. The data storage tape cartridge of claim 27, wherein the reference portion of the base plate includes a pin sized to be received by a datum arm of the registration device.

33. The data storage tape cartridge of claim 32, wherein the pin defines a side-toside location of the storage tape at the window relative to the head.

34. The data storage tape cartridge of claim 27, wherein an exterior of the housing includes a datum point configured to be engaged by the registration device, the datum point being spaced from the reference portion of the base plate.

35. The data storage tape cartridge of claim 34, wherein the datum point defines a tilt of the storage tape relative to the reference portion of the base plate.

36. A data storage tape cartridge comprising:
    a housing defined by a first housing section and a second housing section, the first and second housing sections forming a window, and the first housing section forming a first opening and a second opening located at opposite sides of the window, respectively;
    a base plate having a first reference portion and a second reference portion, the base plate being nested within the first housing section such that the first reference portion is exposed through the first opening and the second reference portion is exposed through the second opening;

at least one tape reel rotatably associated with the base plate; and a storage tape maintained by the at least one tape reel, the storage tape being accessible through the window in the housing.

37. The data storage tape cartridge of claim 36, wherein the first reference portion and the second reference portion are recessed within the housing.

38. The data storage tape cartridge of claim 36, wherein the first reference portion and the second reference portion each include a forward edge, the forward edges being coplanar.

39. The data storage tape cartridge of claim 36, wherein the first reference portion and the second reference portion each include a horizontal contact surface, the horizontal contact surfaces being coplanar.

* * * * *

UNITED STATES PATENT AND TRADEMARK OFFICE
CERTIFICATE OF CORRECTION

PATENT NO. : 6,069,777  
DATED : May 30, 2000  
INVENTOR(S) : Vanderheyden et al.

Page 1 of 1

It is certified that error appears in the above-identified patent and that said Letters Patent is hereby corrected as shown below:

<u>Title page,</u>  
Item [56], under U.S. PATENT DOCUMENTS, the following should be added:

| | | | |
|---|---|---|---|
| -- 5,202,809 | 04/93 | Dodt et al. | ..............................360/132 |
| 5,297,755 | 03/94 | Felde et al. | .............................242/199 |
| 5,316,235 | 05/94 | East et al. | ..............................242/199 |
| 5,513,815 | 05/96 | Erickson et al. | ...........................242/346 -- |

Signed and Sealed this

Twenty-third Day of July, 2002

Attest:

Attesting Officer

JAMES E. ROGAN  
*Director of the United States Patent and Trademark Office*